(12) United States Patent
Nabeiro

(10) Patent No.: US 10,752,417 B2
(45) Date of Patent: Aug. 25, 2020

(54) SUPPLY CARTRIDGE, MACHINE FOR PREPARING BEVERAGES AND PROCESS OF OPERATION OF A MACHINE USING SAID SUPPLY CARTRIDGE

(71) Applicant: NOVADELTA - COMÉRCIO E INDÚSTRIA DE CAFÉS S.A., Lisbon (PT)

(72) Inventor: Rui Miguel Nabeiro, Campo Maior (PT)

(73) Assignee: NOVADELTA—COMÉRCIO E INDÚSTRIA DE CAFÉS S.A., Lisbon (PT)

( * ) Notice: Subject to any disclaimer, the term of this patent is extended or adjusted under 35 U.S.C. 154(b) by 379 days.

(21) Appl. No.: 15/550,102

(22) PCT Filed: Feb. 11, 2016

(86) PCT No.: PCT/PT2016/050004
§ 371 (c)(1),
(2) Date: Aug. 10, 2017

(87) PCT Pub. No.: WO2016/130035
PCT Pub. Date: Aug. 18, 2016

(65) Prior Publication Data
US 2018/0029771 A1    Feb. 1, 2018

(30) Foreign Application Priority Data

Feb. 11, 2015 (PT) .......................... 108208

(51) Int. Cl.
*A47J 31/36* (2006.01)
*B65D 75/42* (2006.01)

(52) U.S. Cl.
CPC .......... *B65D 75/42* (2013.01); *A47J 31/3657* (2013.01); *A47J 31/3647* (2013.01)

(58) Field of Classification Search
CPC ................ A47J 31/3647; A47J 31/3657; A47J 31/3661; A47J 31/3652
(Continued)

(56) References Cited

U.S. PATENT DOCUMENTS 3,181,734 A * 5/1965 Ensign .................. A47J 31/408
   222/83.5
3,356,011 A * 12/1967 Parraga ............... A47J 31/3614
   99/289 R (Continued)

FOREIGN PATENT DOCUMENTS

DE    20 2011 103 565 U1    3/2012
EP     0 457 708 A1   11/1991

OTHER PUBLICATIONS

International Search Report for PCT/PT2016/050004 dated May 20, 2016 [PCT/ISA/210].

*Primary Examiner* — Reginald Alexander
(74) *Attorney, Agent, or Firm* — Sughrue Mion, PLLC

(57) ABSTRACT

The present invention refers to a supply cartridge (1) comprising a package casing (11) and a support (2) of single portions, provided as a strip-like support, or similar, presenting a plurality of single dose portions (21) of an edible substance, such as for example coffee, disposed successively along a respective longitudinal direction. In particular, the cartridge (1) according to the present invention includes a support (2) of single portions adapted so that provides a more efficient and reliable movement of said support (2) of single portions out of said package casing (11).

The present invention further refers to a machine (10) for preparing beverages, adapted for using a supply cartridge (1), as well as to a process of preparing beverages based upon a machine (10) for preparing beverages of the type of the present invention.

17 Claims, 6 Drawing Sheets

(58) Field of Classification Search
USPC .................. 221/72, 74; 99/289 T, 289 D
See application file for complete search history.

(56) References Cited

U.S. PATENT DOCUMENTS

| | | | | |
|---|---|---|---|---|
| 4,353,293 A | * | 10/1982 | Illy | ............... A47J 31/3657 |
| | | | | 99/283 |
| 4,426,919 A | * | 1/1984 | Rhoten | ............ A47J 31/408 |
| | | | | 99/289 T |
| 4,733,797 A | * | 3/1988 | Haber | ............ B65D 83/0472 |
| | | | | 221/131 |
| 5,520,093 A | | 5/1996 | Ackermann | |
| 5,555,790 A | | 9/1996 | Ackermann | |
| 5,896,806 A | * | 4/1999 | Dal Tio | ............ A47J 31/3657 |
| | | | | 99/289 T |

\* cited by examiner

SUPPLY CARTRIDGE, MACHINE FOR PREPARING BEVERAGES AND PROCESS OF OPERATION OF A MACHINE USING SAID SUPPLY CARTRIDGE

CROSS REFERENCE TO RELATED APPLICATIONS

This application is a National Stage of International Application No. PCT/PT2016/050004, filed on Feb. 11, 2016, which claims priority from Portuguese Patent Application No. 108208, filed on Feb. 11, 2015, the contents of all of which are incorporated herein by reference in their entirety.

FIELD OF THE INVENTION

The present invention refers to the field of supply cartridges adapted for collection of a support of single portions, provided as a strip-like support, or similar, presenting a plurality of single dose portions of an edible substance.

The present invention further refers to a machine for preparing beverages adapted for using a supply cartridge of the type of the present invention, as well as to a process for preparing beverages by means of a machine and supply cartridge of the type of the present invention.

BACKGROUND OF THE INVENTION

The prior art includes several solutions relating to beverage preparation machines based on edible substances, and adapted so as to process a plurality of single doses provided in a strip-like or similar support that is displaced so as successively supply an extraction device adapted so as to extract a respective beverage.

Documents U.S. Pat. Nos. 3,143,954 and 3,213,777 disclose beverage preparation machines that present an actuation device adapted for moving a strip with a plurality of single doses successively up to an extraction device.

Document GB 2266228 discloses a machine of the same type adapted for operating with storage means of a strip presenting a plurality of single dose portions. Said document discloses a solution for the problem of the traction of the strip of multiple portions that is based upon providing a plurality of holes disposed along the side edges of the strip and adapted to be engaged by corresponding engagement saliences provided in an actuation mechanism. This solution presents several constrains, including in terms of greater construction complexity of said machine.

Document WO 2013/169134 A2 filed by the applicant of the present invention, discloses a machine for preparing beverages of the same type and adapted for processing a conduction support that provides a substantially hermetic envelope to a plurality of single doses. However, said document also does not disclose a solution that guarantees the transfer of movement by means of traction between the surfaces of the actuation element and the last single doses disposed furthest upstream in the support of single portions.

None of the documents in prior art disclose a solution for the efficient and reliable displacement of the end part of said support of single portions out of the respective packaging.

Moreover, none of the documents disclose a solution for fixating said package in simple manner in ergonomic terms and in reliable manner in operational terms, in a respective beverage preparation machine, so that the latter resists to the traction force exerted upon said support of single portions.

GENERAL DESCRIPTION OF THE INVENTION

The objective of the present invention is to provide a supply cartridge comprising a package casing adapted to house a support of single portions provided in a flexible and elongated support, of the strip-type or similar, and adapted so that provides an efficient and reliable displacement of respective support of single portions out of said package casing, in particular so that the furthest upstream part of said support of single portions can be removed in efficient and reliable manner from the inside of said package casing when driven from outside thereof.

Said supply cartridge is preferentially adapted for use in a machine for preparing beverages, such as for example of the espresso type coffee, tea and similar, notably by means of extraction of aromatic substances packaged in said single dose portions.

This objective is solved according to the present invention by means of a supply cartridge according to claim 1.

Another objective of the present invention is to provide a machine for preparing beverages adapted for using a cartridge comprising a support of single portions in a strip form presenting a plurality of single portions, and that provides simple and reliable means for fixating of said cartridge, so as to contribute to an efficient movement of traction of said support of single portions out of said cartridge.

This objective is solved according to the present invention by means of a machine for preparing beverages according to claim 9.

Another objective of the present invention is to provide a process for preparing beverages by means of a machine for preparing beverages adapted for using a cartridge comprising a support of single portions, and that provides a more ergonomic and reliable of using said cartridge.

This objective is solved according to the present invention by means of a process according to claim 14.

DESCRIPTION OF THE FIGURES

The invention shall now be explained in greater detail based upon preferred embodiments thereof and the Figures attached.

The Figures show, in simplified schematic representations.

DESCRIPTION OF PREFERRED EMBODIMENTS OF THE INVENTION

As referred above, there are known several solutions in the prior art of supply cartridges (1) adapted for use in a machine (10) for preparing beverages and collecting a strip-like, or similar, support (2) of single portions inside thereof, and presenting a plurality of single dose portions (22) provided successively along a respective extension (E).

Figure 1:
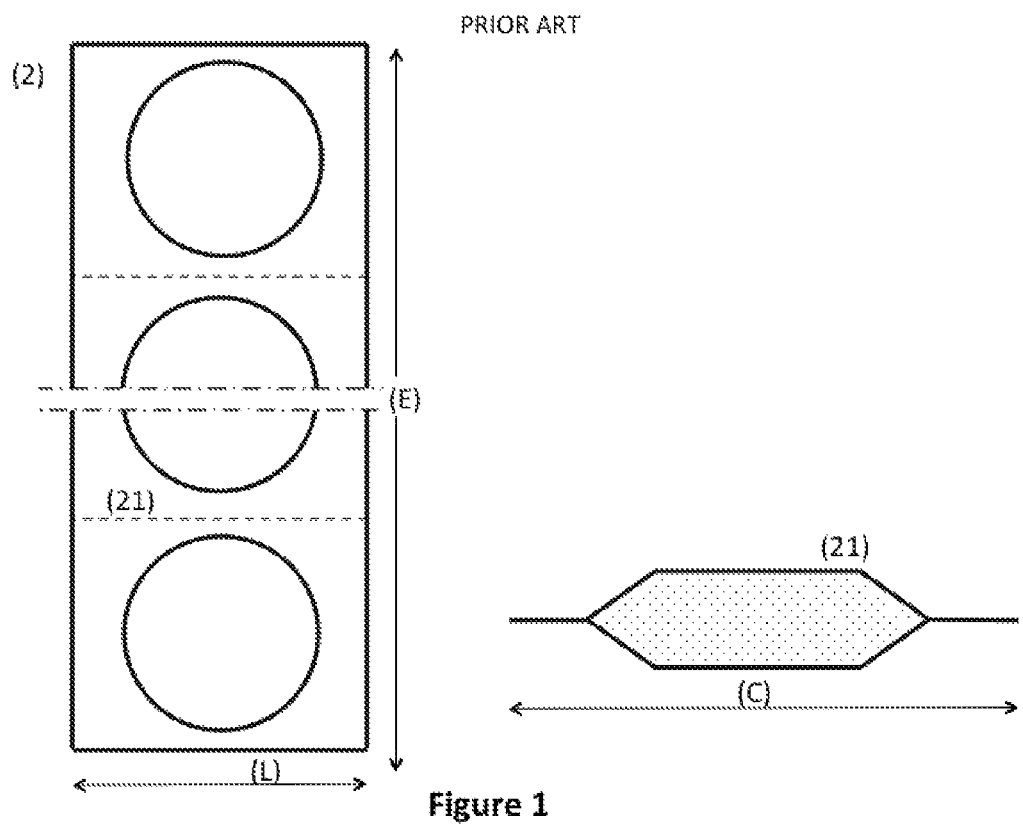
FIG. 1: top view of a support (2) of single portions (on the left-side) and side view of a single dose portion (21) (on the right-side) according to prior art.

FIG. 1 represents views of a support (2) of single portions according to the prior art, whereby said single dose portions (21) present a length (C) along the direction of said extension (E), and a width (L) along a cross direction.

Figure 2:
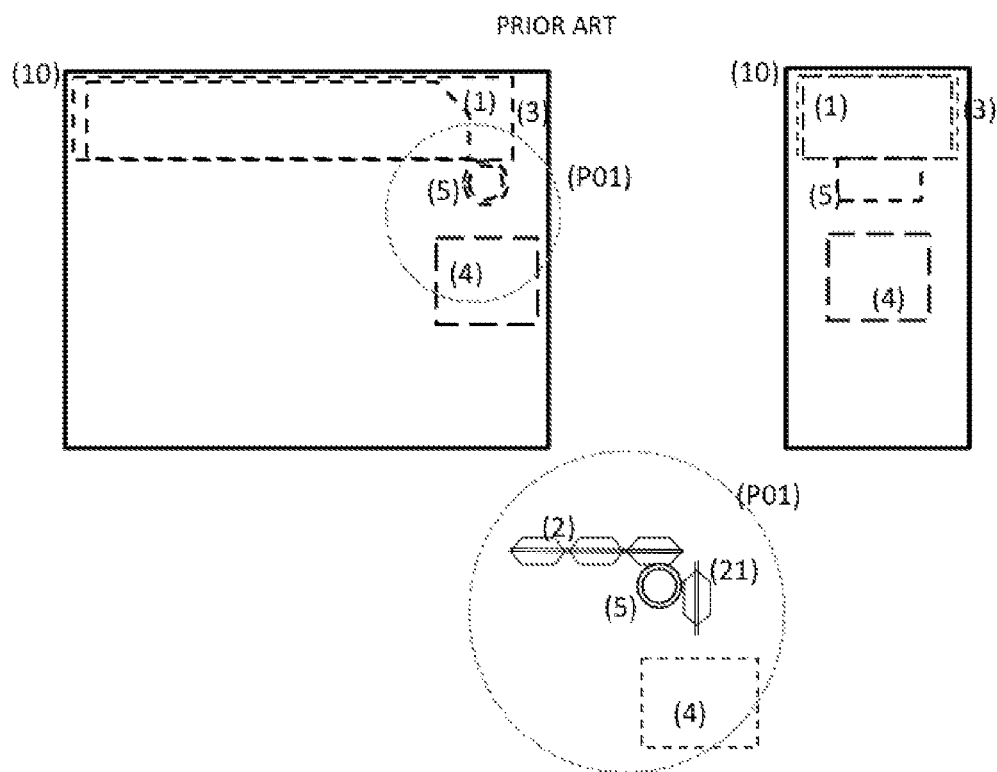
FIG. 2: side view (on the top, left-side) and front view (on the top, right-side), as well as detail P01 (on the bottom), of a machine (10) for preparing beverages according to prior art, adapted for using a supply cartridge (1) that includes a support (2) of single portions according to FIG. 1.

FIG. 2 represents a machine (10) for preparing beverages according to the prior art, adapted so as to use a supply cartridge (1) that comprises a support (2) of single portions of the type represented in FIG. 1. As one can observe, said machine (10) presents at least one collection disposition (3) adapted to fixate said supply cartridge (1), at least one extraction device (4) adapted so that can collect said single dose portion (21) inside thereof, and at least one actuation device (5) disposed downstream of said supply cartridge (1) and upstream of said extraction device (4) and provided so that can move said support (2) of single doses by means of rotation and thereby supply respective single dose portions (21) successively to said extraction device (4).

In particular, as one can better observe in detail P01 of FIG. 2, said actuation device (5) is adapted so that can rotate and that way exert a traction force upon a downstream edge of said support (2) of single portions, thereby moving the furthest downstream single dose portion (21) from a substantially horizontal displacement direction to a substantially vertical displacement direction, to a position where it is separated from the remanding support (2) of single portions and falls under the action of the gravity force inside of said extraction device (4).

Figure 3:
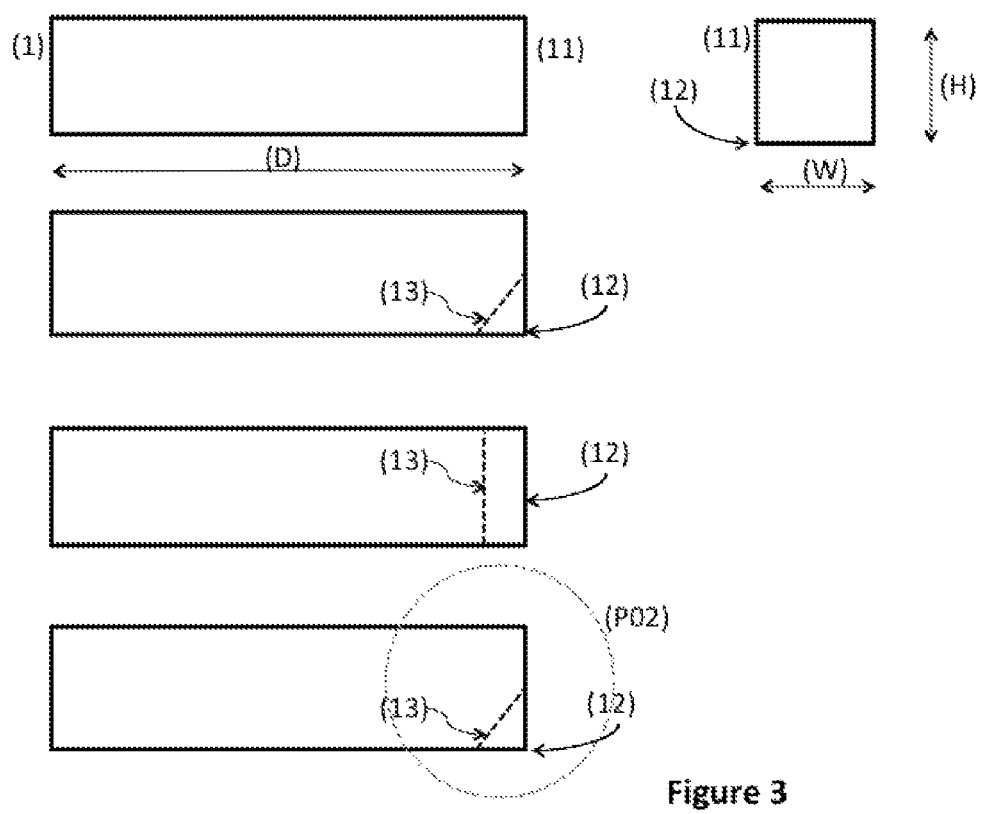
FIG. 3: side views of the faces of an embodiment of a package casing (11) of a supply cartridge (1) according to the present invention.

FIG. 3 represents a first embodiment of a supply cartridge (1) according to the present invention. In particular, according to a preferred embodiment, said supply cartridge (1) comprises a package casing (11) that presents a substantially parallelepiped form presenting a height (H) and a depth (D), and adapted to collect a support (2) of single portions inside thereof, as well as presenting a weakening line provided in a exit corner (12) and adapted so that can be manually ruptured.

Figure 4:
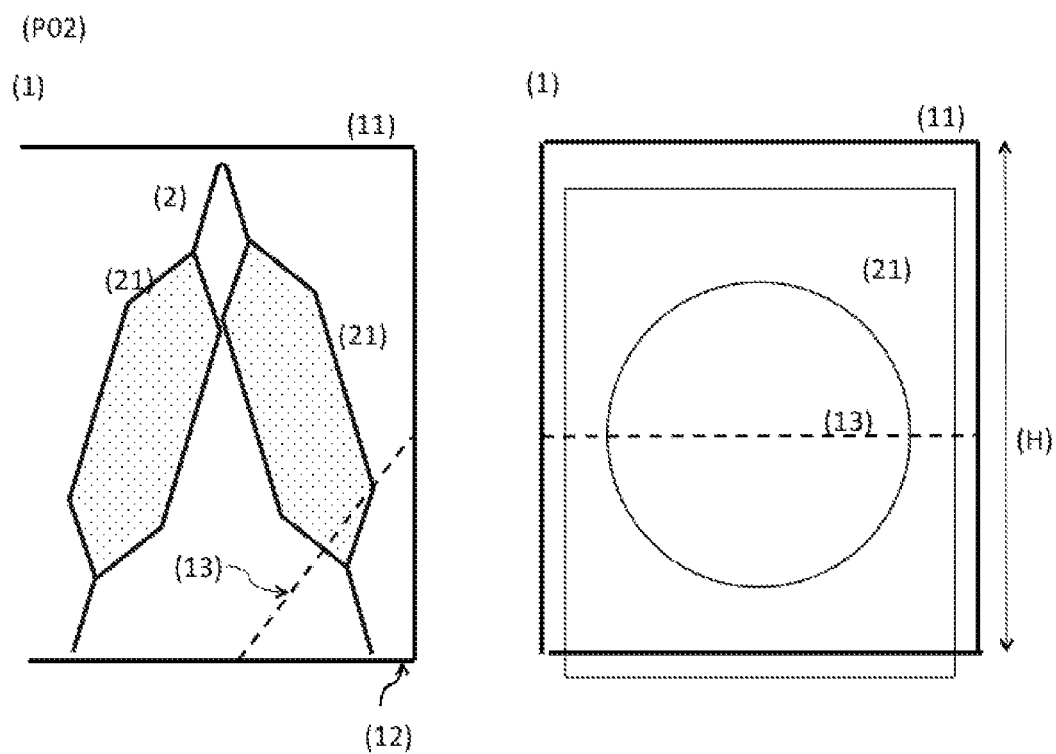
FIG. 4: detail view P02 (left-side) according to FIG. 3 and front view (right-side) of a supply cartridge (1) according to the present invention.

As one can better observe in FIG. 4, in the case of a first type of supply cartridge (1), said support (2) of single portion is disposed in zigzag so that its extension (E) is collected along the length (D) of the package casing (11), so that a first downstream edge results in the proximity of an exit opening (12).

Figure 5:
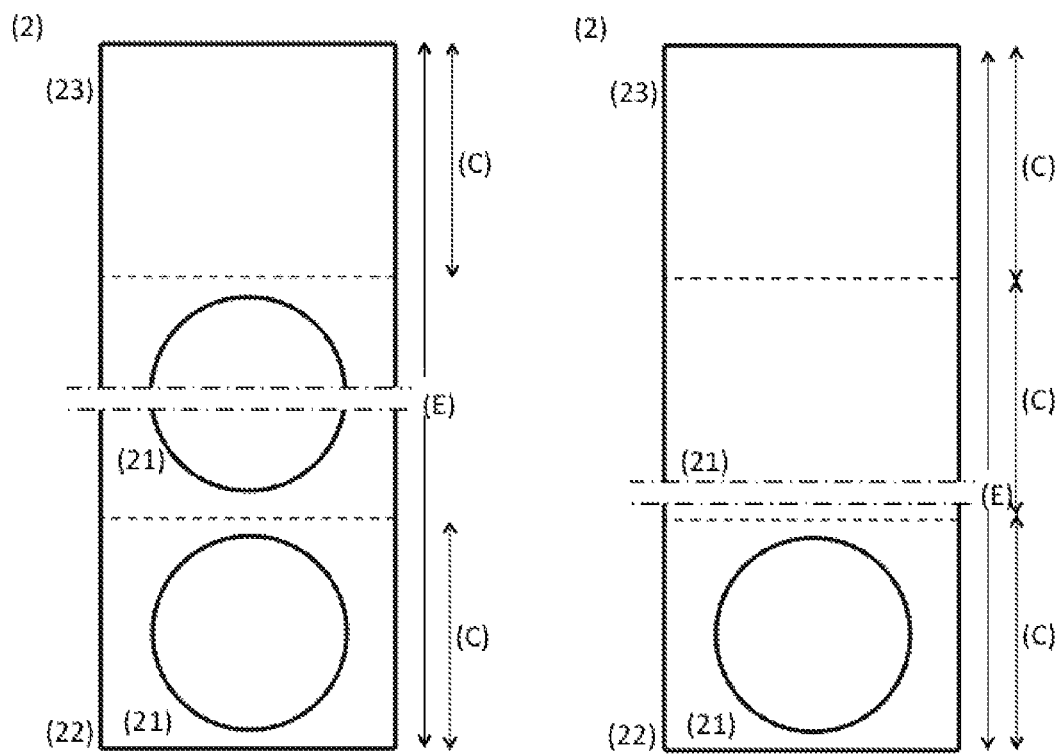
FIG. 5: top views of two embodiments of a support (2) of single portions of a supply cartridge (1) according to the present invention.

FIG. 5 represents a first set of embodiments of a support (2) of single portions contained in a supply cartridge (1) according to the present invention.

According to a first inventive aspect, said support (2) of single portions presents a second upstream edge (23) provided without single dose portions (21) along an extension that corresponds to at least one length (C)—drawing on the left-side —, preferentially at least two times the length (C) —drawing on the right-side.

This way, when a last single dose portion (21) presenting a length (C) and disposed in said upstream edge (23), arrives to an actuation device (4)—provided for example as detailed further below—there is still an upstream portion of material of said support (2) of single portions, notably in an extension corresponding to at least one length (C), that provides a counterweight and that way improves the transfer of movement from said actuation device (4) to the support (2) of single portions.

According to a preferred embodiment, said second edge (23) is provided in the same format and material as the remanding support (2) of single portions. Only one single dose portion (21) is not provided, and therefore also its respective weight.

In dimensional terms, according to a preferred embodiment, said support (2) of single portions presents a plurality of single dose portions (21) with a length (C) between 40 and 70 mm, preferentially between 50 and 60 mm. Moreover, said support (2) of single portions presents between 10 and 120 single dose portions (21), preferentially between 20 and 80 single dose portions along the respective extension (E).

Figure 6:
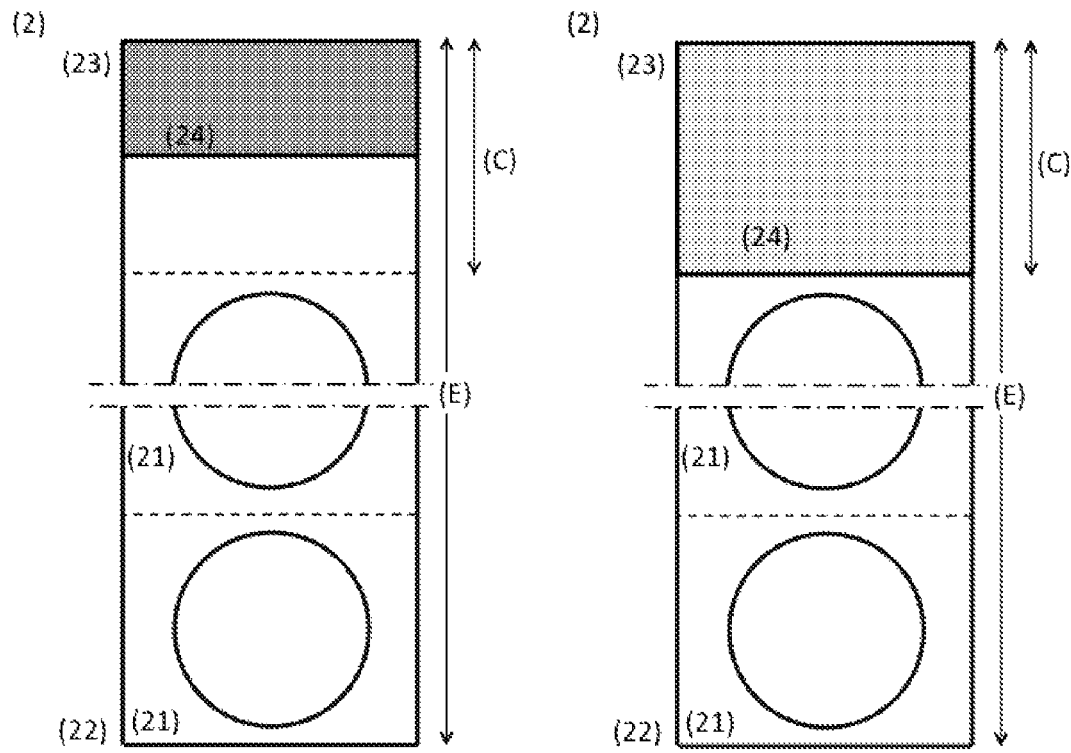
FIG. 6: top views of two preferred embodiments of a support (2) of single portions of a supply cartridge (1) according to the present invention.

FIG. 6 represents a second set of embodiments of support (2) single portions contained in a supply cartridge (1) according to the present invention.

As one can observe, the support (2) of single portions further presents an extension of length (C) without single dose portions (21) in the respective upstream edge (23), whereby in this case this extension represents a structural reinforcement part (24) that presents a bigger linear density than the remanding support (2) of single portions and that develops along at least part of said length (C).

Figure 7:
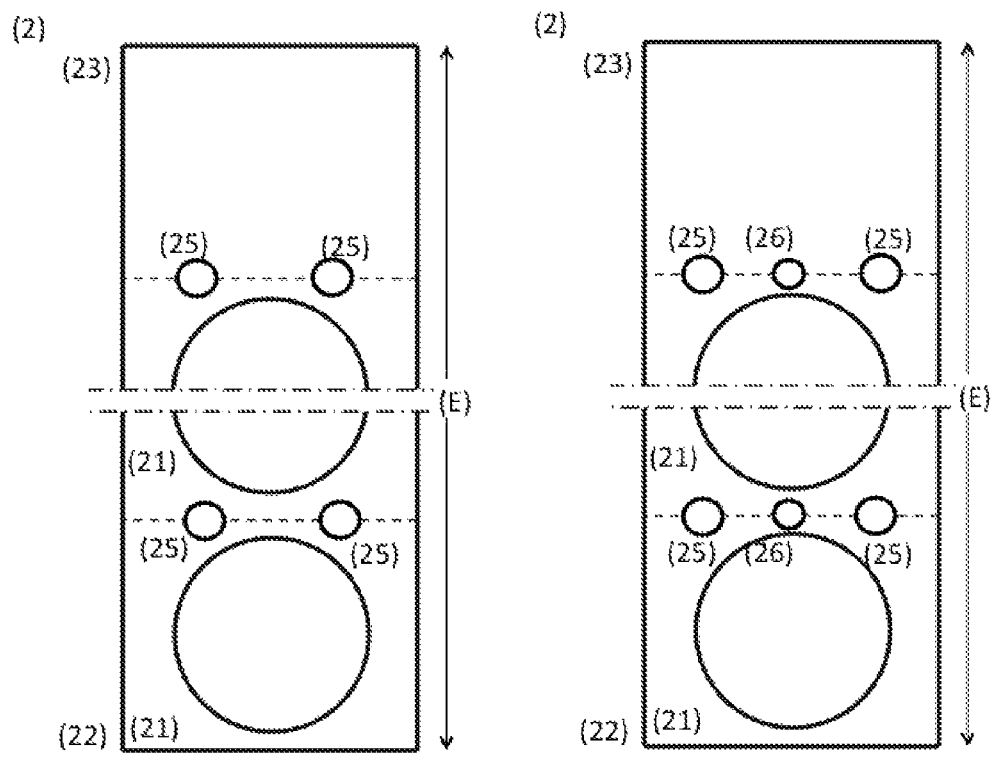
FIG. 7: top views of two preferred embodiments of a support (2) of single portions of a supply cartridge (1) according to the present invention.

FIG. 7 represents a third set of embodiments of support (2) of single portions contained in a supply cartridge (1) according to the present invention.

As one can observe, said support (2) of single portions in this case presents holes (25) in the dividing region between successive single dose portions (21), whereby said holes (25) are adapted so as to engage with corresponding engagement elements, in particular with traction pins (51) provided in the actuation device (5)—as it shall be presented in greater detail further below —, so as to provide a more efficient transfer of the traction force to said support (2) of single portions.

According to a preferred embodiment, said support (2) of single portions presents a plurality of holes (25) uniformly distributed along at least the central region of the dividing regions between successive single dose portions (21). Given the width of the support (2) of single portions, a greater number of holes (25) thus advantageously increases the efficiency and reliability of the transfer of movement to the support (2) of single portions, so that it is preferred when there are provided at least three holes (25) for engagement.

Figure 8:
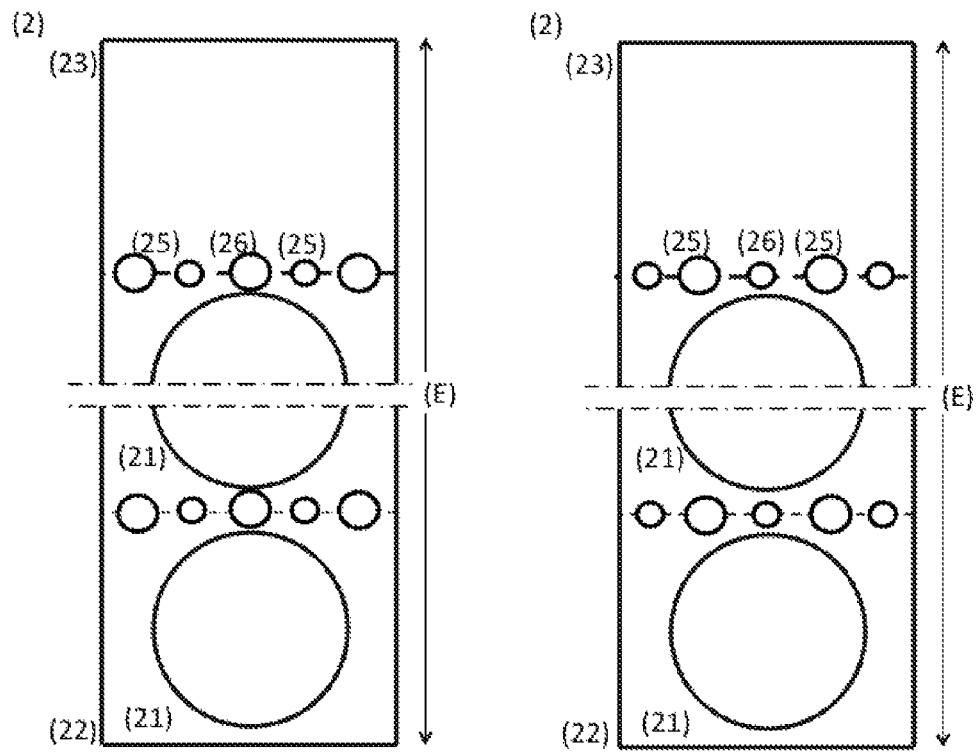
FIG. 8: top views of two preferred embodiments of a support (2) of single portions of a supply cartridge (1) according to the present invention.

FIG. 8 represents a fourth set of embodiments of a support (2) contained in a supply cartridge (1) according to the present invention. As one can observe, said support (2) of single portions in this case presents a plurality of holes (25, 26), in particular at least four holes (25, 26) disposed along the cross direction and presenting at least two different dimensions. This configuration advantageously enables a better transfer of movement from an actuation device (5) provided in a machine (10) for preparing beverages.

Figure 9:
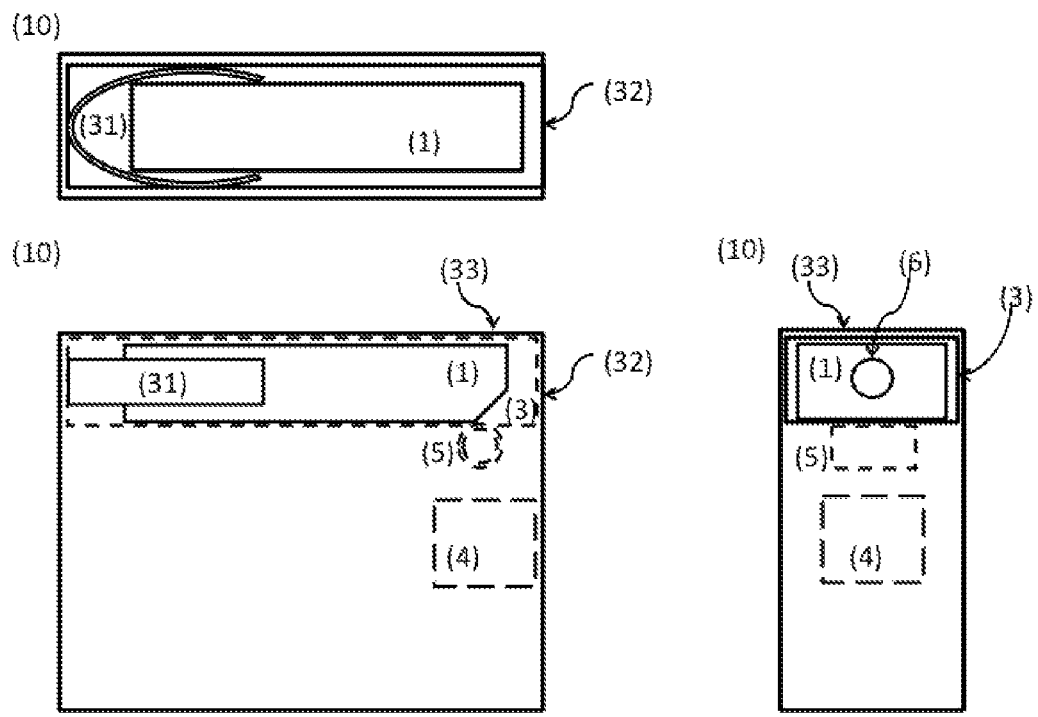
FIG. 9: side view (left-side) and front view of a machine (10) for preparing beverages with a first embodiment of a supply cartridge (1)

FIG. 9 represents a first embodiment of a machine (10) for preparing beverages adapted for using a supply cartridge (1) of the type of the present invention. In particular, the machine (10) presents a collection disposition (3) configured with a form that substantially corresponds to the form of the base zone of said types of supply cartridges (1, 1'), in particular to respective width (W) and depth (D). In this case, said collection disposition (3) is configured in form a substantially parallelepiped box.

According to a preferred embodiment, a first type of supply cartridge (1) can be completely housed inside of said collection disposition (3) and temporarily closed in its front and top faces. In particular, said collection disposition (3) presents front (32) and top parts (33) adapted so that can be fixated in removable manner, or can be rotated around an axis, thereby facilitating the introduction of at least one type of cartridge, preferentially of at least two types of supply cartridges (1, 1').

As one can also observe, said supply cartridge (1) further presents an information device (6), provided for example in the form of a RFID or similar, and disposed in the front face thereof, so that said information device (6) can be read by a device adapted correspondingly and disposed in said front part.

Moreover, according to another inventive aspect, said collection disposition (3) presents fixation means (31) disposed inside and adapted so that exert an elastic pressure upon at least part of the side faces of said supply cartridges (1, 1'). In the case of the represented embodiment, said fixation means (31) are provided in a U-like form with the opening oriented to the front zone and adapted so that they exert an elastic pressure upon the side faces of the supply cartridge (1). This type of fixation advantageously provides a rapid placement of the supply cartridge (1) in position, without requiring a particular intervention by a user. Moreover, this type of solution provides a sufficient fixation of the supply cartridge (1) relative to the traction force exerted in the front zone of the respective package casing (11) upon a support (2) of single portions, so that the movement of the latter results more efficient and reliable.

Figure 10:
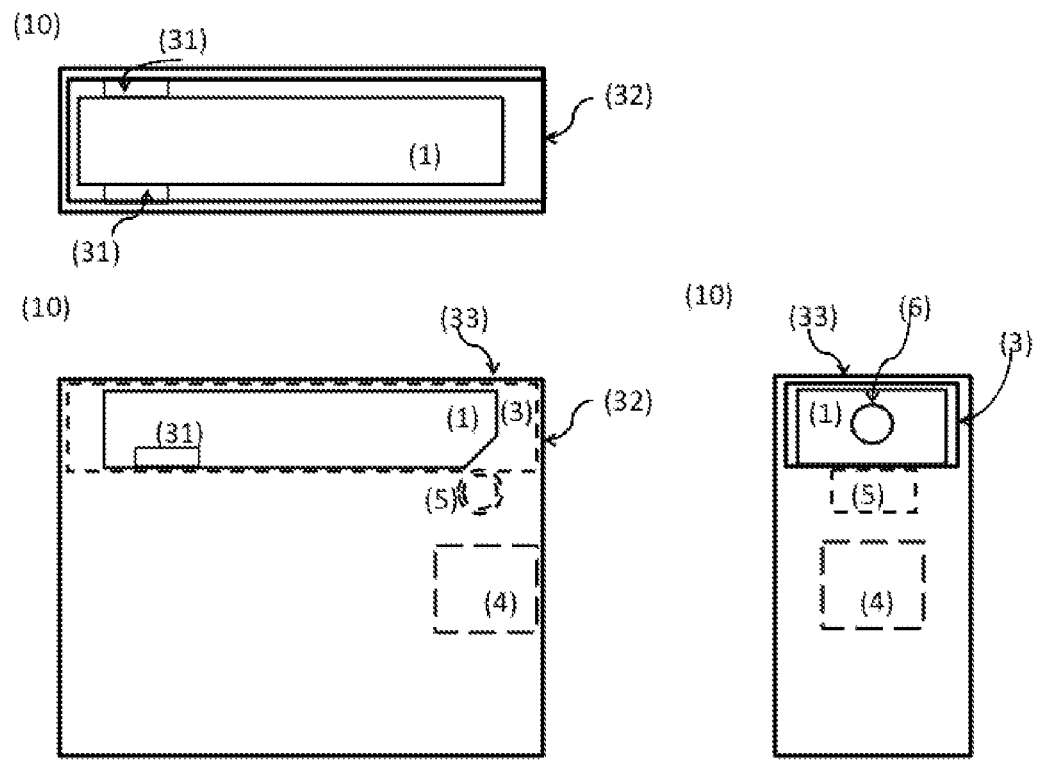
FIG. 10: side view (left-side) and front view of a machine (10) for preparing beverages with a second embodiment of fixation means of a first type of supply cartridge (1)

FIG. 10 represents a second embodiment of the collection disposition (3).

According to this preferred embodiment, said fixation means (31) are provided as at least one pair of fixation means (31) disposed in opposition, at least one distal region of said collection disposition (3) relative to the front part of the machine (10). Said fixation means (31) are provided as elastic means adapted so that can be elastically deformed when the supply cartridge (1) in placed in position, thereby exerting an elastic pressure force upon the side faces of said supply cartridge (1). According to a preferred embodiment, said fixation means (31) present an extension of at least 1 cm, preferentially at least 2 cm, along the depth direction (D) of said machine (10) for preparing beverages.

Figure 11:
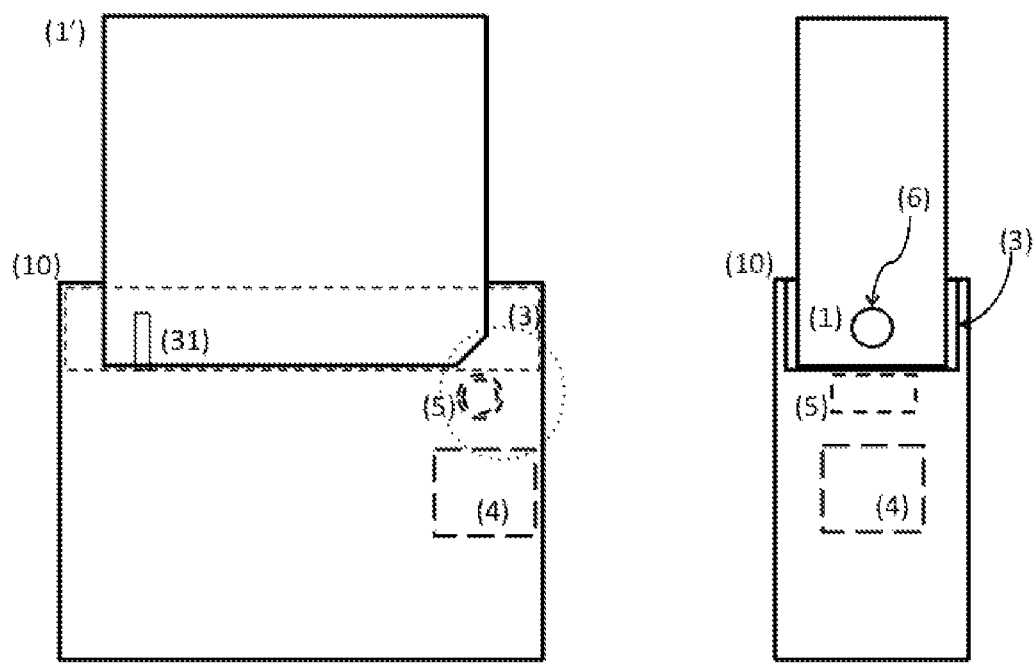
FIG. 11: side view (left-side) and front view of a machine (10) for preparing beverages with a second embodiment of fixation means, in this case for a second type of supply cartridge (1')

FIG. 11 represents the same embodiment of the collection disposition (3) as represented in FIG. 10, but in this case with a supply cartridge (1') of a different type, in particular a supply cartridge (1') presenting similar width (W) and depth (D) dimensions and a different height (H).

As one can observe, according to a preferred embodiment, said fixation means (31) are provided so that can be rotated on a respective edge, between a substantially horizontal orientation and a substantially vertical orientation and vice-versa, so as to better adjust to different types of supply cartridge (1, 1') presenting different heights (H).

Figure 12:
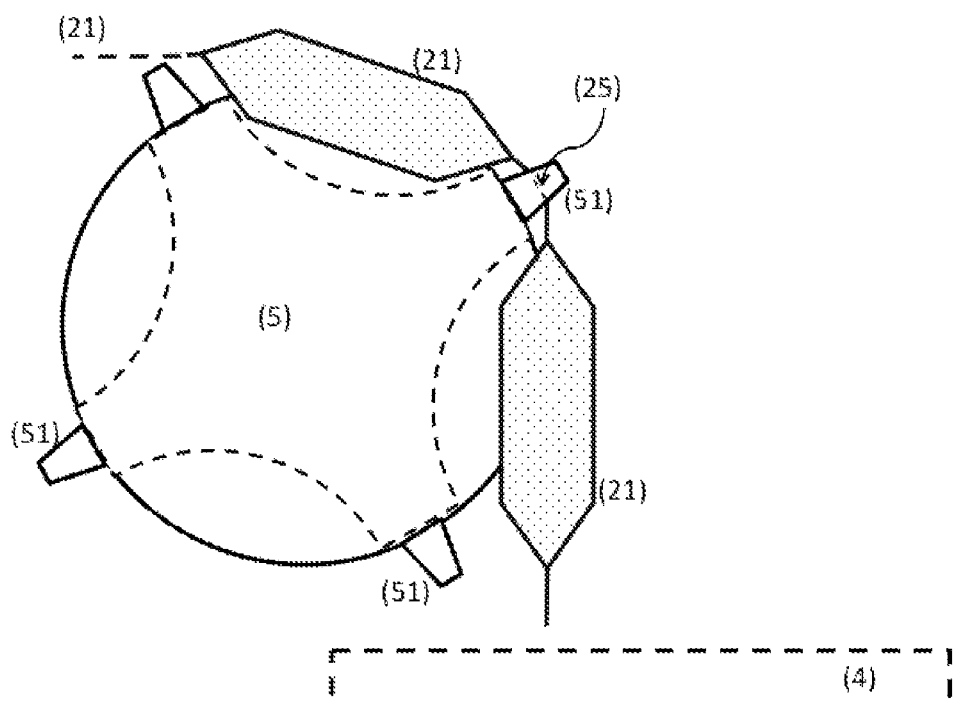
FIG. 12: side views of an embodiment of an actuation device (5) provided in a machine (10) for preparing beverages according to the present invention.

FIG. 12 represents a detail view of the actuation device (5) provided in a machine (10) for preparing beverages according to the present invention.

As represented, said actuation device (5) is provided as a driving wheel element disposed in a horizontal axis so that can rotate around thereof and thus transfer a force of traction to the support (2) of single portions, so as to move it out of the package casing (11) upstream and in the direction of the extraction device (4) downstream. According to a preferred embodiment, said actuation device (5) presents traction pins (51) in the respective perimeter surface adapted so that can engage in corresponding holes (25) provided in the region between successive single dose portions (21), as presented above.

According to a preferred embodiment, there are provided at least four traction pins (51) preferentially presenting at least two different dimensions, so that the taller and thinner initially guide the side alignment of the support (2) of single portions and the shorter and thicker then exert a particular transfer of traction force to said support (2) of single portions along the displacement direction thereof.

Lisbon, Feb. 10, 2016

The invention claimed is:

1. A supply cartridge (1) adapted for supplying a support (2) of single portions, that presents a plurality of single dose portions (21) adapted so as to contain an edible substance, such as for example roast and ground coffee, to a machine (10) for preparing edible products, such as for example aromatic beverages, and comprising:

a package casing (11) adapted so as to house said support (2) of single portions inside thereof, and having a general parallelepiped form, or similar, presenting a width (W), a depth (D) and a height (H), and having a package corner (12), wherein said support (2) of single portions is in a strip form, or similar, and has a support extension (E) and a width (L) and comprises a plurality of single dose portions (21), each containing at least one edible substance and having a length (C), whereby said support (2) of single portions is provided inside of said package casing (11) with a downstream edge portion (22) in the proximity of the package corner (12) where there is rovided an exit opening, wherein said support (2) of single portions has a second upstream edge portion (23) that is provided without single dose portions (21) and has an extension size adapted so as to provide a counterweight to a traction force exerted from outside of the package casing (11) upon the single dose portions (21) furthest downstream in said support (2) of single portions, as said furthest downstream single dose portions (21) are pulled out of said package casing (11), and wherein said second edge (23) is provided with at least one part of structural reinforcement (24) that presents a bigger linear density than the remanding support (2) of single portions and that develops along at least part of the respective extension (E).

2. The supply cartridge (1) according to claim 1, wherein said second edge (23) is provided without single dose portions (21) along an extension corresponding to at least one time said length (C).

3. The supply cartridge (1) according to claim 1, wherein said cartridges (1, 1') present a similar format and only one different dimension.

4. The supply cartridge (1) according to claim 2, wherein said second edge (23) is provided without single dose portions (21) along an extension corresponding to at least two times said length (C).

5. The supply cartridge (1) according to claim 3, wherein, said cartridges (1, 1') present a similar width (W) and depth (D) and a different height (H).

6. A supply cartridge (1) adapted for supplying a support (2) of single portions, that presents a plurality of single dose portions (21) adapted so as to contain an edible substance, such as for example roast and ground coffee, to a machine (10) for preparing edible products, such as for example aromatic beverages, and comprising:

a package casing (11) adapted so as to house said support (2) of single portions inside thereof, and having a general parallelepiped form, or similar, presenting a width (W), a depth (D) and a height (H), and having a package corner (12), wherein said support (2) of single portions is in a strip form, or similar, and has a support extension (E) and a width (L) and comprises a plurality of single dose portions (21), each containing at least one edible substance and having a length (C), whereby said support (2) of single portions is provided inside of said package casing (11) with a downstream edge portion (22) in the proximity of the package corner (12) where there is rovided an exit opening, wherein said support (2) of single portions has a second upstream edge portion (23) that is provided without single dose portions (21) and has an extension size adapted so as to provide a counterweight to a traction force exerted from outside of the package casing (11) upon the single dose portions (21) furthest downstream in said support (2) of single portions, as said furthest downstream single dose portions (21) are pulled out of said package casing (11), and wherein said second edge (23) is provided in the same format and material as the remanding support (2) of single portions and presents a structural reinforcement (24) in a different material.

7. A supply cartridge (1) adapted for supplying a support (2) of single portions, that presents a plurality of single dose portions (21) adapted so as to contain an edible substance, such as for example roast and ground coffee, to a machine (10) for preparing edible products, such as for example aromatic beverages, and comprising:

a package casing (11) adapted so as to house said support (2) of single portions inside thereof, and having a general parallelepiped form, or similar, presenting a width (W), a depth (D) and a height (H), and having a package corner (12), wherein said support (2) of single portions is in a strip form, or similar, and has a support extension (E) and a width (L) and comprises a plurality of single dose portions (21), each containing at least one edible substance and having a length (C), whereby said support (2) of single portions is provided inside of said package casing (11) with a downstream edge portion (22) in the proximity of the package corner (12) where there is provided an exit opening, wherein said support (2) of single portions has a second upstream edge portion (23) that is provided without single dose portions (21) and has an extension size adapted so as to provide a counterweight to a traction force exerted from outside of the package casing (11) upon the single dose portions (21) furthest downstream in said support (2) of single portions, as said furthest downstream single dose portions (21) are pulled out of said package casing (11), and wherein said support (2) of single portions presents holes (25, 26) with at least two different characteristic dimensions, provided along a cross alignment along the dividing region between successive single dose portions (21).

8. A machine (10) for preparing beverages adapted for collecting at least two types of supply cartridges (1, 1'), comprising:

a collection disposition (3) configured in a form that corresponds substantially to the form at least of a base region of said types of supply cartridges (1, 1'), in particular to a respective width (W) and depth (D), and presenting fixation means (31) inside adapted to exert an elastic pressure upon at least part of side faces of said supply cartridges (1, 1'), wherein said supply cartridge (1) is adapted for supplying a support (2) of single portions, that presents a plurality of single dose portions (21) adapted so as to contain an edible substance, such as for example roast and ground coffee, to a machine (10) for preparing edible products, such as for example aromatic beverages, and comprising:

a package casing (11) adapted so as to house said support (2) of single portions inside thereof, and having a general parallelepiped form, or similar, presenting a width (W), a depth (D) and a height (H), and having a package corner (12), wherein said support (2) of single portions is in a strip form, or similar, and has a support extension (E) and a width (L) and comprises a plurality of single dose portions (21), each containing at least one edible substance and having a length (C), whereby said support (2) of single portions is provided inside of said package casing (11) with a downstream edge portion (22) in the proximity of the package corner (12) where there is provided an exit opening, wherein said support (2) of single portions has a second upstream edge portion (23) that is provided without single dose portions (21) and has an extension size adapted so as to provide a counterweight to a traction force exerted from outside of the package casing (11) upon the single dose portions (21) furthest downstream in said support (2) of single portions, as said furthest downstream single dose portions (21) are pulled out of said package casing (11).

9. The machine (10) according to claim 8, wherein said fixation means (31) are disposed at least in a distal region of said collection disposition (3) relative to the front region of the machine (10).

10. The machine (10) according to claim 8, wherein said fixation means (31) are provided so that can be rotated between a substantially horizontal position and a substantially vertical position and vice-versa, so as to better adjust to types of supply cartridges (1, 1') presenting different heights (H).

11. The machine (10) according to claim 8, having an actuation device (5) adapted to rotate and thereby exert a traction force upon said support (2) of single portions, wherein said actuation device (5) has a plurality of traction pins (51) disposed along cross alignments relative to the rotation direction.

12. The machine (10) according to claim 8, further comprising an actuation device (5) adapted to rotate and thereby exert a traction force upon said support (2) of single portions,
whereby said actuation device (5) has a plurality of traction pins (51) adapted to engage with holes (25, 26) of said support (2) of single portions and disposed in the perimeter surface along at least two cross alignments relative to the rotation direction.

13. A process for preparing an aromatic beverage, comprising the steps:
providing a machine (10) for preparing beverages that comprises an actuation device (5) provided so that said actuation device can rotate around a substantially horizontal axis and is disposed upstream of an extraction device (4);
providing a supply cartridge (1) comprising a support (2) of single portions in a strip form, or similar, that has a plurality of successive single dose portions (21), adapted so as to contain an edible substance, such as for example roast and ground coffee, to a machine (10) for preparing edible products, such as for example aromatic beverages, and comprising:
a package casing (11) adapted so as to house said support (2) of single portions inside thereof, and having a general parallelepiped form, or similar, presenting a width (W), a depth (D) and a height (H), and having a package corner (12),
wherein said support (2) of single portions is in a strip form, or similar, and has a support extension (E) and a width (L) and comprises a plurality of single dose portions (21), each containing at least one edible substance and having a length (C),
whereby said support (2) of single portions is provided inside of said package casing (11) with a downstream edge portion (22) in the proximity of the package corner (12) where there is provided an exit opening,
wherein said support (2) of single portions has a second upstream edge portion (23) that is provided without single dose portions (21) and has an extension size adapted so as to provide a counterweight to a traction force exerted from outside of the package casing (11) upon the single dose portions (21) furthest downstream in said support (2) of single portions, as said furthest downstream single dose portions (21) are pulled out of said package casing (11);
placing said supply cartridge (1) in a collection disposition (3) of said machine (10), in particular between parts of a fixation device (31) or between two fixation devices (31), so that is retained along a longitudinal direction of said collection device (3) by means of elastic tension provided by said fixation devices (31);
placing a single dose portion (21) that is furthest downstream in said support (2) of single portion in interaction with an exterior perimeter surface of said actuation device (5), and
driving said actuation device (5) in a rotation movement so that the latter displaces said support (2) of single portions by means of traction.

14. The process according to claim 13, wherein said step of placing said supply cartridge (1) in a collection disposition (3) further includes the steps:
conducting at least one of rotation and removal of at least one of a front part (32) and a top part (33) of said collection disposition (3);
optionally, rotating the fixation devices (31) provided in said collection disposition (3), from a horizontal position to a vertical position or vice-versa; and
optionally, placing a first single dose portion (21) in interaction with an exterior perimeter surface of said actuation device (5), including placing the holes (25, 26) provided in said support (2) of single portions in engagement with corresponding traction pins (51) provided in said actuation device (5).

15. The process according to claim 14, wherein said support (2) of single portions presents at least three holes (25).

16. A supply cartridge (1) adapted for supplying a support (2) of single portions, that presents a plurality of single dose portions (21) adapted so as to contain an edible substance, such as for example roast and ground coffee, to a machine (10) for preparing edible products, such as for example aromatic beverages, and comprising:
a package casing (11) adapted so as to house said support (2) of single portions inside thereof, and having a general parallelepiped form, or similar, presenting a width (W), a depth (D) and a height (H), and having a package corner (12),
wherein said support (2) of single portions is in a strip form, or similar, and has a support extension (E) and a width (L) and comprises a plurality of single dose portions (21), each containing at least one edible substance and having a length (C),
whereby said support (2) of single portions is provided inside of said package casing (11) with a downstream edge portion (22) in the proximity of the package corner (12) where there is rovided an exit opening,
wherein said support (2) of single portions has a second upstream edge portion (23) that is provided without single dose portions (21) and has an extension size adapted so as to provide a counterweight to a traction force exerted from outside of the package casing (11) upon the single dose portions (21) furthest downstream in said support (2) of single portions, as said furthest downstream single dose portions (21) are pulled out of said package casing (11),
wherein said support (2) of single portions presents a plurality of holes (25), provided along a cross alignment along at least the central region of the dividing region between successive single dose portions (21), and does not present holes along the side edge regions of said support (2) of single portions, and
wherein said support (2) of single portions presents at least three holes (25), provided along a cross alignment along at least the central region of the dividing region between successive single dose portions (21), and does not present holes along the side edge regions of said support (2) of single portions.

17. A supply cartridge (1) adapted for supplying a support (2) of single portions, that presents a plurality of single dose portions (21) adapted so as to contain an edible substance, such as for example roast and ground coffee, to a machine (10) for preparing edible products, such as for example aromatic beverages, and comprising:
a package casing (11) adapted so as to house said support (2) of single portions inside thereof, and having a general parallelepiped form, or similar, presenting a width (W), a depth (D) and a height (H), and having a package corner (12),
wherein said support (2) of single portions is in a strip form, or similar, and has a support extension (E) and a width (L) and comprises a plurality of single dose portions (21), each containing at least one edible substance and having a length (C), whereby said support (2) of single portions is provided inside of said package casing (11) with a downstream edge portion (22) in the proximity of the package corner (12) where there is provided an exit opening, wherein said support (2) of single portions has a second upstream edge portion (23) that is provided without single dose portions (21) and has an extension size adapted so as to provide a counterweight to a traction force exerted from outside of the package casing (11) upon the single dose portions (21) furthest downstream in said support (2) of single portions, as said furthest downstream single dose portions (21) are pulled out of said package casing (11), and wherein said cartridges (1, 1') present information means (6), whereby said information means (6) is provided in a same relative position in said cartridges (1, 1') in relation to the front region of a collection disposition (3) provided in a machine (10) for preparing beverages, and wherein said information means (6) is an RFID type.

\* \* \* \* \*